Nov. 20, 1962  C. FLOYD  3,064,510
SPHERICAL CONTOUR SLOTTING AND SHAPING LATHE
Filed July 25, 1960  5 Sheets-Sheet 1

INVENTOR
Camden Floyd
BY
Synnestvedt & Lechner
ATTORNEYS

Nov. 20, 1962 C. FLOYD 3,064,510
SPHERICAL CONTOUR SLOTTING AND SHAPING LATHE
Filed July 25, 1960 5 Sheets-Sheet 2

INVENTOR
Camdon Floyd
BY
Synnestvedt & Lechner
ATTORNEYS

Nov. 20, 1962         C. FLOYD         3,064,510

SPHERICAL CONTOUR SLOTTING AND SHAPING LATHE

Filed July 25, 1960         5 Sheets-Sheet 3

INVENTOR
Carndon Floyd
BY
Synnestvedt & Lechner
ATTORNEYS

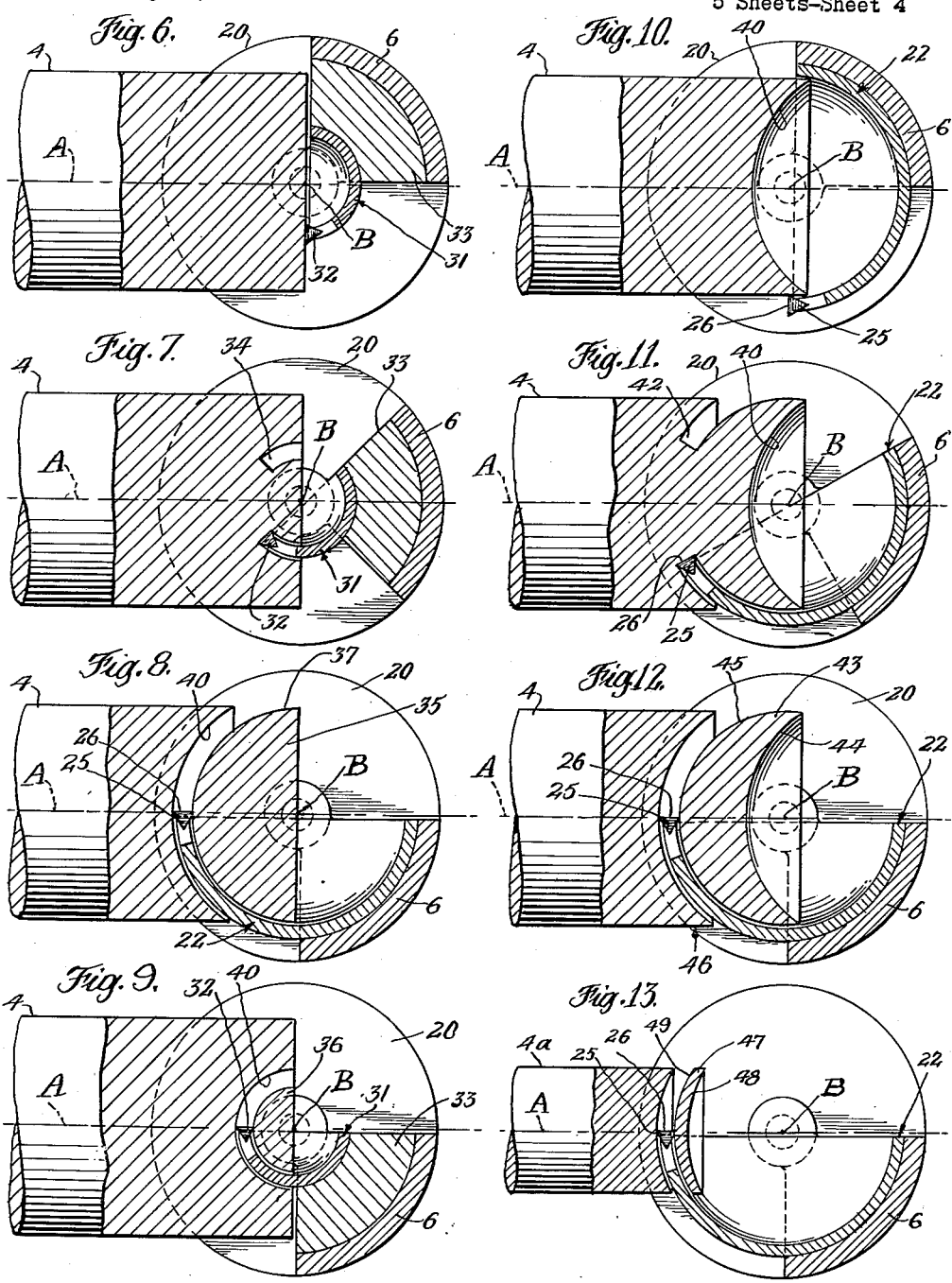

United States Patent Office 3,064,510
Patented Nov. 20, 1962

3,064,510
SPHERICAL CONTOUR SLOTTING AND SHAPING LATHE
Camdon Floyd, South Fort Mitchell, Ky., assignor to The Lodge & Shipley Company, Cincinnati, Ohio, a corporation of Ohio
Filed July 25, 1960, Ser. No. 45,160
5 Claims. (Cl. 82—12)

This invention in general relates to machine tools and in particular relates to methods and apparatus for machining spherically-shaped slots and/or surfaces.

Broadly considered, the invention provides methods and equipment involving the concept of causing relative motion between a tool and a blank so that the tool penetrates into the blank and cuts a spherical slot, the locus of the relative motion between the blank and the tool for the cutting operation being on the surface of a segment or a zone of a sphere. This basic operation lends itself to the forming of slots and concave and/or convex surfaces, any of which may vary widely in dimension.

The operation can form spherical slots of different depths, widths and contours either on the side or on the face of an article. For example, a slot may be formed the mouth of which is in the plane of the surface of a plate or on the end of a cylinder or whose mouth extends around the side of a cylinder.

The slot forming operation may be carried to a point where a section is physically severed from the blank. This aspect is conducive to the forming of a wide variety of articles having concave and/or convex surfaces due to the fact that the severed section has a convex surface while there remains on the blank a corresponding concave surface. Thus a flat surface such as the surface of a plate or the like may be provided with one or more concave cavities. The severing operation is highly advantageous from the standpoint of forming hollow articles having both concave and convex surfaces. For example, a blank may be successively slotted along an axis so that with each operation there is severed a semi-spherical article having an inside concave surface and an outside convex surface.

The foregoing is illustrative of the various uses of the invention and with that in mind the preferred methods and apparatus of the invention will be described below in connection with the following drawings wherein:

FIGURES 4–16 are fragmentary sectional views illustrating various cutting operations.

Figure 1:
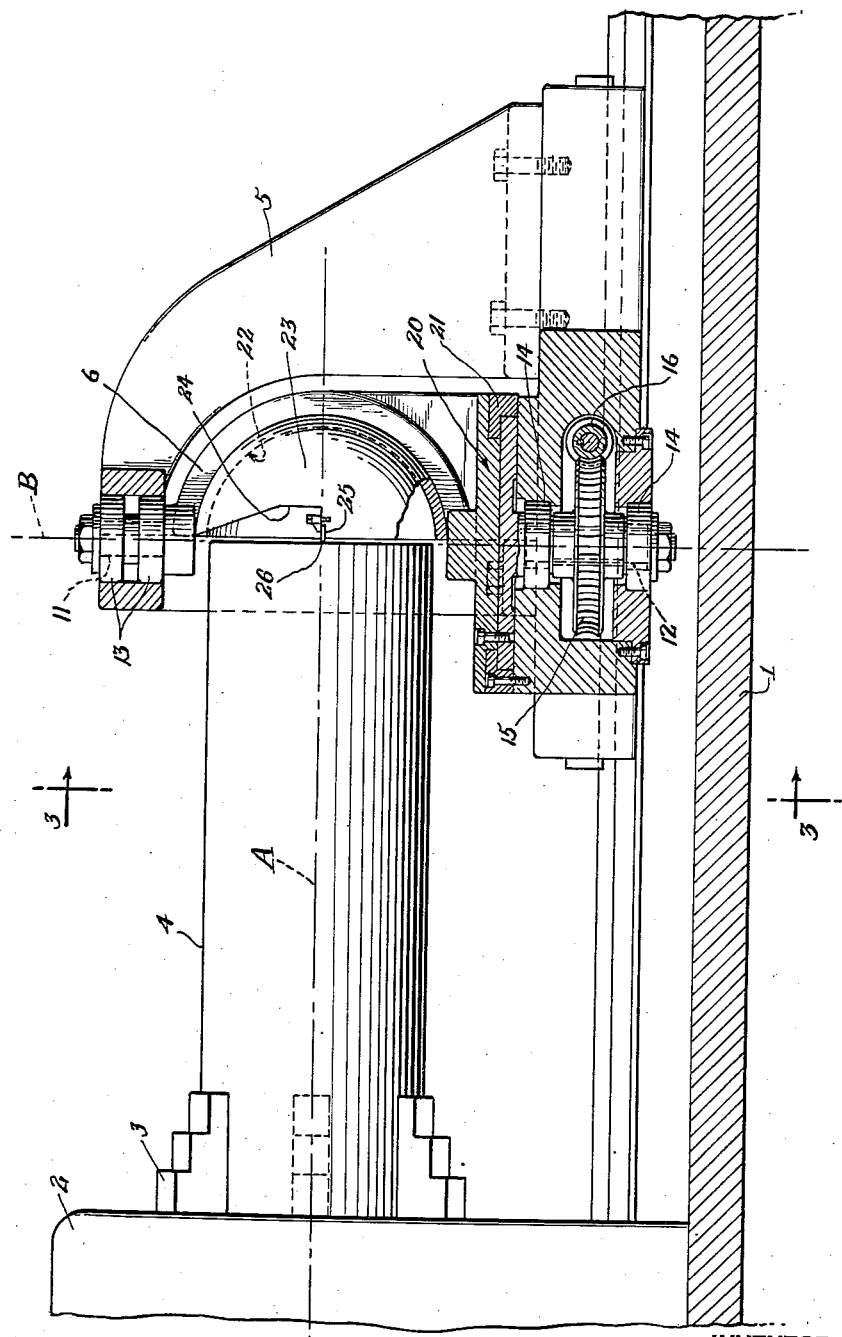
FIGURE 1 is a side elevation partially in section of equipment embodying the invention.
Figure 2:
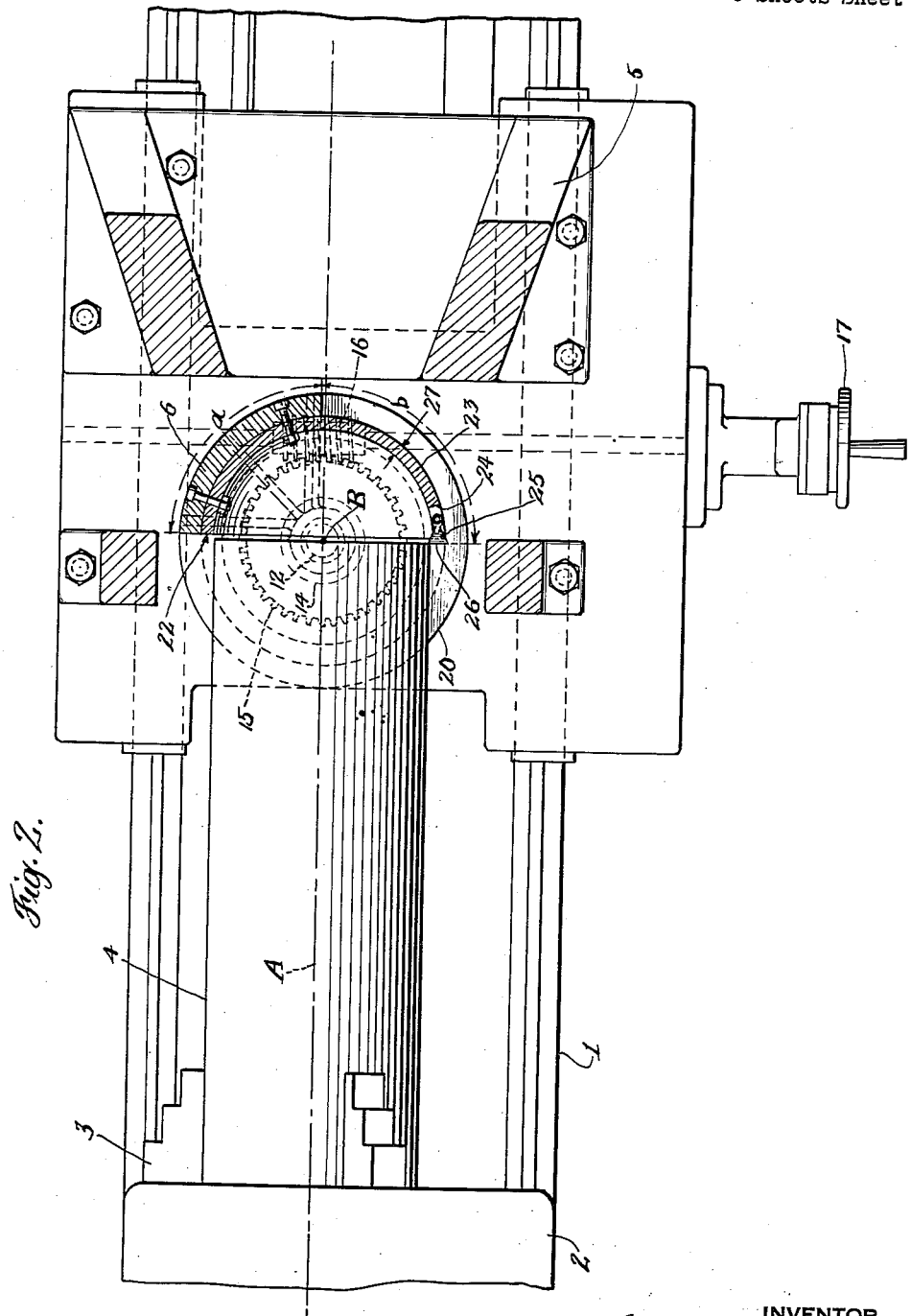
FIGURE 2 is a plan view of FIGURE 1 with certain parts cut away.
Figure 3:
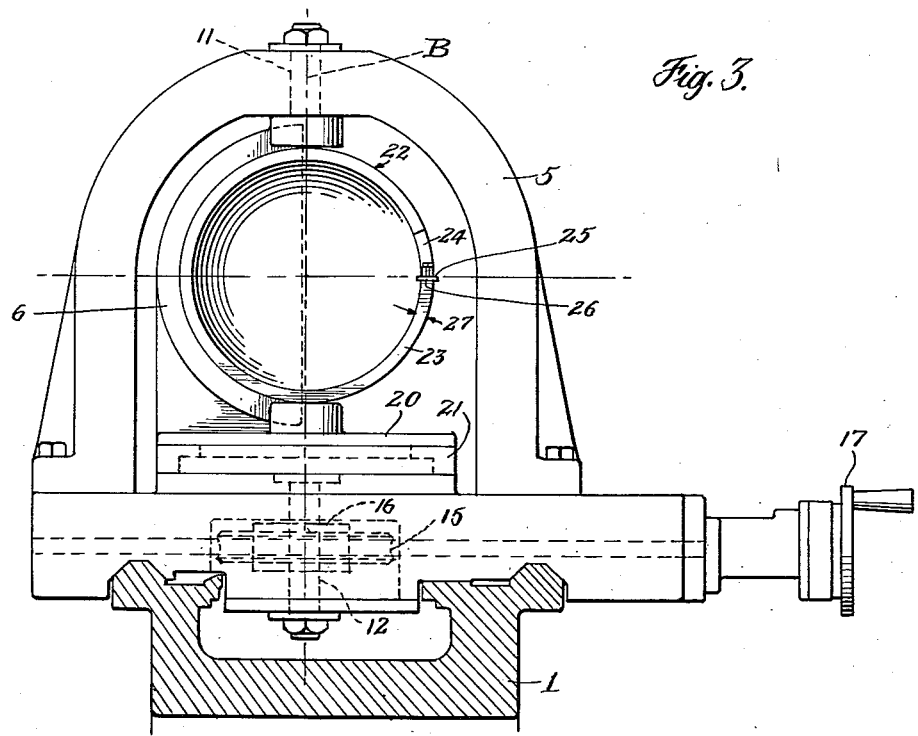
FIGURE 3 is a sectional view taken along the line 3—3 of FIGURE 1 but with the blank removed.

In FIGURES 1, 2 and 3 a bed 1 supports a headstock 2 carrying a chuck 3 which mounts a body of material or blank 4. In the embodiment shown the blank 4 is generally cylindrical in shape. The bed 1, headstock 2 and chuck 3 are conventional form with the headstock having means (not shown) for rotating or driving the chuck and workpiece about the axis A. Also mounted on the bed 1 is a frame 5. Conventional means (not shown) are provided for moving the frame along the bed toward and away from the headstock and for locking the frame in some desired position. The bed 1, headstock 2 and chuck 3 may be parts of a conventional engine lathe.

The frame 5 mounts a tool support 6 which it will be observed is somewhat semi-spherical in shape. The included angle $a$ of the widest part of the support (taken in a plane containing the horizontal axis A) and having its center at the intersection of the axis A and the vertical axis B, is somewhat less than 90°. The axis B is normal to the axis A.

The tool support is mounted on the frame for rotation about the axis B by means of the upper shaft 11 and lower shaft 12. The shaft 11 is rotatably mounted in the frame by means of the bearings 13 and the shaft 12 is rotatably mounted in the frame by means of the bearings 14. The shaft 12 is adapted to be rotated by means of the worm wheel 15 and worm 16. The worm 16 is suitably connected to a hand wheel 17 for rotation therewith. Precise motion of the tool support about the axis B is obtained by virtue of the annular guide 20 (integral with the shaft 12 and support 6) operating in the annular gib 21. The tool support 6 carries a semi-spherical tool holder 22 which is removably bolted to the support. The tool holder has an arcuate section 23 which extends away from the support. With reference to FIGURE 2 it will be observed that the arcuate section 23 has an included angle $b$ greater than 90° as taken in the horizontal plane containing the axis A. The support 6 and holder 22 are constructed so that the center of the holder or sphere 22 lies at the intersection of the axes A and B.

As best indicated in FIGURE 1, the tool holder has a recess 24 in which is mounted the cutting tool 25. It will be noted that the cutting edge 26 of the cutting tool 25 is of wider dimension than the width 27 of the arcuate section 23. The cutting edge 26 of the tool lies substantially in a horizontal plane containing the axis A.

From the foregoing construction it will be apparent that when the tool support and holder are rotated about the axis B the tool will move along a path (lying in the horizontal plane containing axis A) which is the arc of a circle whose center lies at the intersection of the axes A and B.

The operation of the device will be explained in connection with FIGURES 4–16.

Figure 4:
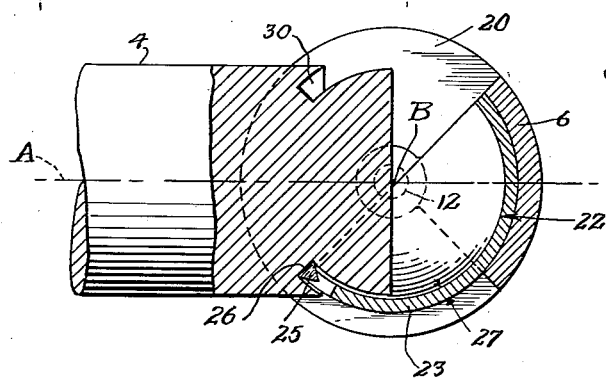
Figure 5:
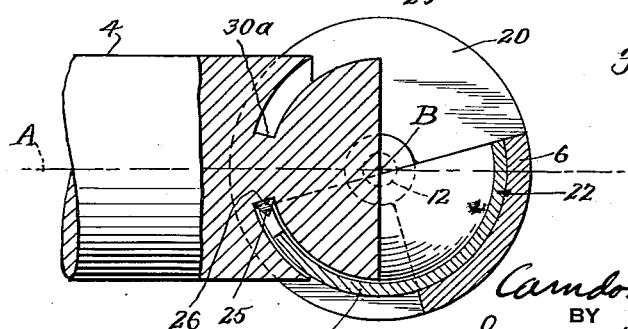

Assume first that the tool 25 and the blank are in the position as shown in FIGURE 2. To provide the relative motion for causing the tool to cut, the blank is rotated and the tool is moved into the blank. The relative motion for causing the tool to cut a spherical slot is provided by said rotation and by the motion afforded by virtue of the movement of the tool support and holder. The latter motion is obtained when the hand wheel 17 is rotated so that the tool support and tool holder rotate clockwise (as viewed in FIGURE 2). The tool penetrates into the blank and with penetration the cutting is commenced. This condition is illustrated in FIGURE 4 where it will be seen that the tool 25 has rotated clockwise about 45° from its position of FIGURE 2 and has cut an arcuate slot 30 in the blank. It will be noted that with the width of the cutting edge 26 of the tool wider than the width 27 of the tool holder the slot 30 accommodates the traverse of the holder into the body of the blank. Rotation of the tool can be continued until the slot 30 is of any desired depth. For example, the tool may be moved to the position shown in FIGURE 4 and then removed, so that the blank is left with the slot 30. On the other hand, the rotation of the tool may be continued, for example, to a point as shown in FIGURE 5 where it will be seen that the tool has been rotated approximately 75° from its position shown in FIGURE 2. In this instance it will be noted that the slot 30 has been increased in depth as indicated at 30a.

In FIGURES 4 and 5 it will be observed that the mouth of the spherically-shaped slot extends around the side of the blank. The equipment of the invention may be adapted for forming spherically-shaped slots on a flat surface. This is illustrated in FIGURES 6 and 7. In FIGURE 6 it will be seen that the tool holder 22 has been replaced with a smaller holder 31 having a tool 32. The tool holder is interconnected to the support 6 by way of the spacer 33. With the blank rotating the support and holder are made to move in a clockwise direction so that the tool 32 cuts the spherical slot 34 as indicated in FIGURE 7. The cutting action of the tool may be continued until the slot 34 is of desired depth.

While I have shown the slotting operation to be on the end of a cylindrically-shaped blank, it will be apparent that the same type of an operation can be carried out where the blank is in the form of a flat blank.

In FIGURES 4, 5, 6 and 7 it will be observed that the locus of relative motion between the tool and the blank lies along the surface of a segment of a sphere whose center is at the intersection of the axes A and B.

In FIGURES 4-7 the cutting action of the tool may be continued until such time as the terminus of the slot being formed lies along the axis A. The position of the tool at this time is shown in FIGURES 8 and 9 where it will be observed that in both instances the sections 35 and 36 are physically severed from the blank. It will be noted that both sections 35 and 36 have spherical convex surfaces 37 and 38 and that the blank is left with a spherical concave surface as indicated at 40 in FIGURE 8 and 41 in FIGURE 9. From the foregoing it will be seen that the invention provides a very easy and convenient means for the forming of semi-spherical articles where the spherical surface is convex.

As mentioned above, the operation of FIGURES 8 and 9 leaves a spherical concave surface on the blank. This aspect is advantageous from the standpoint of the forming of a plurality of hollow spherically-shaped articles from a single billet. For example, in FIGURE 10 it will be seen that the blank of FIGURE 8 having the spherical concave surface 40 is set up to be again cut by the tool 25. As will be noted the tool 25 is in a position to form a slot which is spaced from the surface 40. With the blank rotating the tool is moved clockwise so that it penetrates into the blank to cut the spherical slot 42 as indicated in FIGURE 11. With further motion of the tool to the terminus point as shown in FIGURE 12 the section 43 is physically severed from the blank. It will be noted that the section 43 is hollow and has an inside concave surface 44 and an outside convex surface 45. If the tool is then set up to cut another slot in the blank, for example at the place indicated at 46, another section similar to the section 43 can be severed.

In FIGURE 13 the tool 25 of FIGURE 10 is shown as forming a saucer-like article 47 having a concave surface 48 and a convex surface 49, from a blank 4a of smaller diameter than the blank illustrated in FIGURE 10. Thus a saucer-like article with little variation in thickness is produced.

It is pointed out that if it is desired to produce saucer-like articles of larger diameter, blanks of the desired diameter are employed with a tool holder of correspondingly larger diameter.

In FIGURES 8-13 it will be noted that the locus of relative motion between the tool and the blank lies along the surface of a segment of a sphere, the center of the sphere being located at the intersection of the axes A and B.

Figure 14:
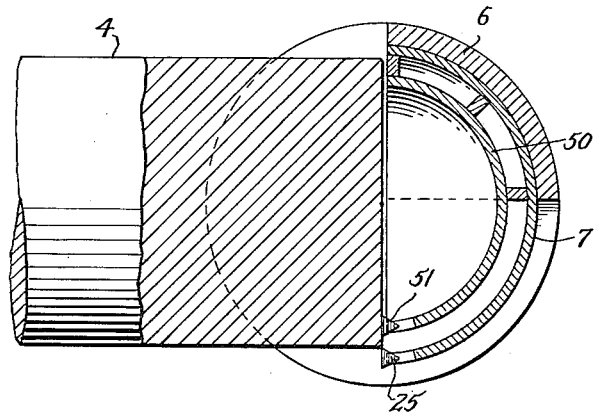
Figure 15:
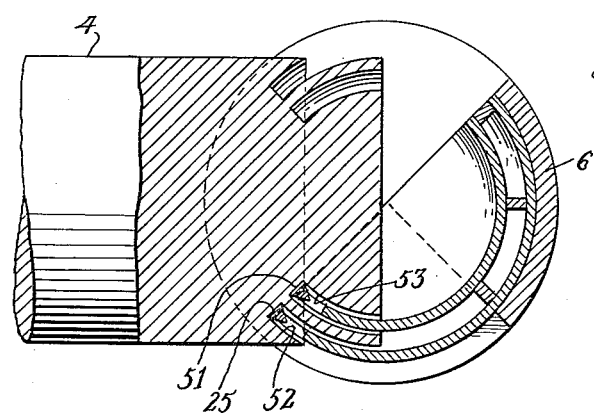
Figure 16:
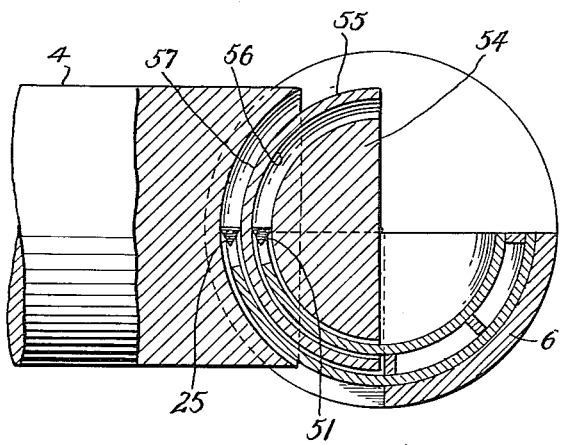

In FIGURES 14-16 I have shown an arrangement for the forming of a pair of concentric spherical slots in a body or for the forming of a true half hemispherical article. In FIGURE 14 the tool support 6 and tool holder 22 carry a second tool holder 50 which is concentric with the holder 22. The tool holder 50 mounts the tool 51. When the assembly is rotated clockwise the tools 25 and 51 begin to cut the spherical slots 52 and 53 on the blank 4. The rotation may continue until the slots are of desired depth as shown in FIGURE 15. Alternatively the rotation may progress until the tools reach the terminus position where the sections 54 and 55 are severed from the blank as indicated in FIGURE 16. The section 54 is similar in shape to the section severed in the operation of FIGURE 8. The section 55 is a true semi-hemispherical article having a uniform thickness of material between the inside concave surface 56 and outside convex surface 57.

I claim:

1. A spherical contour slotting and shaping machine tool comprising a head stock, a chuck rotatably mounted therein whose center defines a first axis of rotation, a bed and a slotting device carried on said bed; said slotting device comprising a frame having bearing means defining a second axis of rotation normal to and intersecting said first axis and carrying a tool support rotatably mounted therein, said tool support being a hollow, partial spherical member and having a center lying at the intersection of said axes, said support carrying a cutting element having an edge lying in a plane containing said first axis and normal to said second axis, whereby when said edge is rotatably fed into a workpiece rotating about said first axis a spherical slot is formed.

2. The construction of claim 1 having power means on said frame rotatably engaged with said support.

3. The construction of claim 1 wherein said member is a hollow, partial spherical section having an included angle of greater than 90° as taken in said plane and wherein said cutting edge is of a greater dimension than walls defining the said member.

4. The construction of claim 3 having power means rotatably engaged with said support.

5. The construction of claim 1 having a second hollow, partial spherical support member carrying a second cutting element and wherein said second member is concentrically supported by said first member.

References Cited in the file of this patent

UNITED STATES PATENTS

| | | |
|---|---|---|
| 670,962 | Lodge | Apr. 2, 1901 |
| 1,556,949 | Mall | Oct. 13, 1925 |
| 1,843,944 | Clemens | Feb. 9, 1932 |
| 2,019,072 | Clemens | Oct. 29, 1935 |
| 2,389,197 | Keller | Nov. 20, 1945 |
| 2,467,070 | Zukas | Apr. 2, 1949 |
| 2,828,658 | Algatt | Apr. 1, 1958 |